United States Patent
Feng et al.

(10) Patent No.: US 9,110,721 B2
(45) Date of Patent: Aug. 18, 2015

(54) JOB HOMING

(71) Applicant: TELEFONAKTIEBOLAGET L M ERICSSON (PUBL), Stockholm (SE)

(72) Inventors: Michael Feng, Mountain View, CA (US); Edmund C. Chen, Sunnyvale, CA (US); Brian Alleyne, Los Gatos, CA (US); Edward Ho, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 405 days.

(21) Appl. No.: 13/730,603

(22) Filed: Dec. 28, 2012

(65) Prior Publication Data

US 2014/0189705 A1    Jul. 3, 2014

(51) Int. Cl.

| | |
|---|---|
| *G06F 9/50* | (2006.01) |
| *H04L 12/721* | (2013.01) |
| *H04L 12/733* | (2013.01) |
| *G06F 9/30* | (2006.01) |
| *G06F 9/38* | (2006.01) |
| *H04L 12/851* | (2013.01) |
| *H04L 12/859* | (2013.01) |
| *H04L 12/863* | (2013.01) |
| *H04L 12/861* | (2013.01) |
| *H04L 12/741* | (2013.01) |
| *H04L 12/911* | (2013.01) |

(52) U.S. Cl.
CPC .............. *G06F 9/5027* (2013.01); *H04L 45/06* (2013.01); *H04L 45/122* (2013.01); *G06F 9/30036* (2013.01); *G06F 9/3885* (2013.01); *H04L 45/74* (2013.01); *H04L 47/2475* (2013.01); *H04L 47/2483* (2013.01); *H04L 47/6295* (2013.01); *H04L 47/70* (2013.01); *H04L 49/9047* (2013.01)

(58) Field of Classification Search
CPC combination set(s) only.
See application file for complete search history.

(56) References Cited

U.S. PATENT DOCUMENTS

| 7,391,786 | B1 | 6/2008 | Prasad et al. | |
|---|---|---|---|---|
| 7,990,974 | B1 * | 8/2011 | Gmuender et al. | ........... 370/392 |
| 2005/0033878 | A1 | 2/2005 | Pangal et al. | |
| 2007/0240161 | A1 | 10/2007 | Prabhakar et al. | |
| 2008/0002681 | A1 * | 1/2008 | Bajic et al. | ..................... 370/389 |
| 2008/0002702 | A1 * | 1/2008 | Bajic et al. | ..................... 370/392 |
| 2008/0247411 | A1 | 10/2008 | Abel et al. | |
| 2009/0235050 | A1 * | 9/2009 | Raghunath et al. | ........... 712/203 |

FOREIGN PATENT DOCUMENTS

EP    1414198    4/2004

* cited by examiner

*Primary Examiner* — Chris Parry
*Assistant Examiner* — Caroline Jahnige
(74) *Attorney, Agent, or Firm* — Nicholson De Vos Webster & Elliott, LLP (57) ABSTRACT

A method executed by a controller of a plurality of processing elements to reduce processing time of a data packet in a network element. The processing elements are arranged in a matrix. Each processing element has a point to point connection with each adjacent processing element, known as a hop. Each processing element also includes a separate processing element storage. The data packet includes a data and a descriptor, the data being transmitted to a first processing element for storage before the descriptor is received by the controller, and the data being processed after the descriptor is received. The method includes receiving the descriptor at the controller, determining that the first processing element does not have an available resource for processing the data, determining a second processing element based on a least number of hops to the first processing element, and transmitting the descriptor to the second processing element.

20 Claims, 4 Drawing Sheets

FIG. 4

JOB HOMING

FIELD

The embodiments of the invention relate to the field of data packet processing during the routing of the data packet in a telecommunications network. Specifically, the embodiments relate to utilizing a computing matrix to process the routing of the data packet.

BACKGROUND

A telecommunications network is a collection of end stations that are connected to each other through communication channels. An end station is any device capable of communicating with other end stations through the channels. Examples of end stations include telephones, fax machines, cell phones, computers, network enabled printers, and even household electronics and appliances that are capable of communicating with other devices across a network. End stations communicate with other end stations by sending data, typically in the form of a packet, to each other through the channels. In some networks, the data packets are managed in the channels to ensure proper delivery of the packets to their intended destination end stations and conserve bandwidth of the channels by reducing or eliminating unnecessary transfers to unintended end stations.

A network element placed at a point where multiple channels connect or intersect is one method of managing the data packets in the channels. After the network element receives a data packet transferred by a source end station, the network element is responsible for processing the data packet. The processing performed by the network element includes determining the intended destination of the data packet and transmitting the data packet through the proper channel toward the destination end station.

Some network elements implement a computing matrix to reduce the processing time of data packets. A computing matrix includes multiple processing elements and is capable of processing multiple data packets simultaneously, one at each processing element. To further reduce processing time, some pre-processing can be performed on each data packet before it is processed by the computing matrix. Additionally, as part of pre-processing, a major portion of the data packet is typically extracted and stored at a processing element of the computing matrix. After pre-processing is complete and the data packet is ready to be processed by the computing matrix, current techniques implement strict scheduling to determine which processing element will perform the processing. Strict scheduling means that the processing of the data packet is always assigned to the processing element where the major portion of the data packet is stored at.

SUMMARY

In one embodiment, a method is executed by a controller of a plurality of processing elements to reduce processing time of a data packet in a network element by opportunistically assigning a processing job to a different processing element than where a data for the processing job resides. The plurality of processing elements are arranged in a matrix with a column position and a row position. Each of the plurality of processing elements has a point to point connection with each adjacent processing element and each processing element includes a separate processing element storage. The data packet includes the data and a descriptor. The data is transmitted to a first processing element of the plurality of processing elements to be stored in a first processing element storage before the descriptor is received by the controller, and the data is processed after the descriptor is received. The method includes receiving the descriptor at the controller. A determination is made that the first processing element does not have an available resource for processing the data. A second processing element of the plurality of processing elements is determined based on a least number of hops to the first processing element, a hop being a connection between two adjacent processing elements. The descriptor is transmitted to the second processing element.

In another embodiment, a controller manages a plurality of processing elements to reduce processing time of a data packet in a network element by opportunistically assigning a processing job to a different processing element than where a data for the processing job resides. The plurality of processing elements are arranged in a matrix with a column position and a row position. Each of the plurality of processing elements has a point to point connection with each adjacent processing element and each processing element includes a separate processing element storage. The data packet includes the data and a descriptor. The data is transmitted to a first processing element of the plurality of processing elements to be stored in a first processing element storage before the descriptor is received by the controller, and the data is processed after the descriptor is received. The controller comprises a receiving module, a scheduling module coupled to the receiving module, and a transmission module coupled to the scheduling module. The receiving module is configured to receive the descriptor. The scheduling module is configured to determine that the first processing element does not have an available resource for processing the data. The scheduling module is further configured to determine a second processing element of the plurality of processing elements based on a least number of hops to the first processing element, a hop being a connection between two adjacent processing elements. The transmission module is configured to transmit the descriptor to the second processing element.

In an example embodiment, a system employs a computing matrix to reduce processing time of a data packet in a network element by opportunistically assigning a processing job. The data packet includes a data and a descriptor. The data is received by the computing matrix and stored before the descriptor is received by the computing matrix. The data is processed after the descriptor is received by the computing matrix. The system comprises a plurality of processing elements configured in a matrix arrangement, and a controller coupled to the plurality of processing elements. Each of the plurality of processing elements has a point to point connection with each adjacent processing element, and each of the plurality of processing elements includes a separate processing element storage. The controller is configured to receive the descriptor of the data packet, and determine that a first processing element of the plurality of processing elements does not have an available resource for processing the data, the data residing within a first processing element storage of the first processing element when the descriptor is received. The controller is further configured to determine a second processing element of the plurality of processing elements based on a least number of hops to the first processing element, a hop being a connection between two adjacent processing elements, and transmit the descriptor to the second processing.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. Such electronic devices store and communicate (internally and/or with other electronic devices over a network) code and data using non-transitory tangible computer-readable storage medium (e.g., magnetic disks; optical disks; read only memory; flash memory devices; phase-change memory) and transitory computer-readable communication medium (e.g., electrical, optical, acoustical or other forms of propagated signals—such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible computer-readable medium and transitory computer-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Data transfers across a telecommunications network depend on a variety of different elements in the network, including the medium through which the transfers occur and the devices which facilitate the transfers. One particular device for facilitating such transfers is a network element. A network element is placed at points in the network where communication channels meet or intersect. These channels can be channels of the same network or channels of different networks, in which case the network element connects the different networks together to form a larger network. The network element is responsible for routing the data, typically in the form of a packet, to the proper channel for transmission to the intended destination. This reduces the amount of traffic on the network by not transmitting the data through unnecessary channels.

The embodiments of the invention provide a method and system for assigning a processing job of a data packet to a processing element of a computing matrix during the routing of the data packet. A computing matrix includes multiple processing elements, and is capable of processing a different data packet at each processing element simultaneously. The processing elements are arranged in a matrix topology, each having a column position and a row position in the matrix. Processing elements can be implemented using any combination of software, firmware, and/or hardware. In some embodiments, each processing element is a distinct hardware processor or a distinct physical portion of a hardware processor. In other embodiments, multiple processing elements are implemented by firmware or software on a single hardware processor capable of processing multiple threads of instructions simultaneously.

Each processing element includes a point to point connection with each adjacent processing element. A "hop" will be used hereinafter to denote a connection between two adjacent processing elements. Additionally, each processing element includes its own separate processing element storage. The storage for multiple processing elements can be implemented on a single memory device by partitioning the device and assigning a partition to each processing element. Alternatively, each processing element can utilize a separate memory device for storage. The memory device can be any device capable of storing data for any amount of time, including volatile and non-volatile memory devices. Furthermore, the memory device can be implemented within the processor (i.e. on the same chip) or separately as a distinct piece of hardware. The memory device is coupled with the processing element or the processor implementing the processing element to allow data transfers between the processing element and the memory device.

A data packet typically includes a descriptor portion (also known as the header) and a user data portion (also known as the payload). The descriptor contains control information for the packet, such as the intended destination of the packet. In contrast, the user data is the substantive portion of the packet and contains the actual data that is being communicated by the end stations. Hereinafter, the user data or payload will be referred to as simply the "data."

During the processing of a data packet in a network element, some pre-processing is typically performed on the data packet before the computing matrix performs the bulk of the processing on the packet. As part of this pre-processing, the data portion of the packet can be extracted and transmitted to a processing element for storage before the packet is ready to be processed by a processing element of the computing matrix. In other words, additional pre-processing can be performed on the descriptor of the packet after the data portion has been extracted and stored. When pre-processing is complete, the descriptor is transmitted to a processing element of the computing matrix for further processing.

Current network elements that implement a computing matrix use strict scheduling to determine which processing element the descriptor will be transmitted to after pre-processing is complete. Strict scheduling means that the descriptor will always be transmitted to the same processing element that the data portion of the packet was transmitted to. The disadvantages of the prior art include that strict scheduling can result in oversubscription of the destination processing element and create an imbalanced load in the computing matrix.

The embodiments of the present invention overcome the disadvantages of the prior art by implementing opportunistic scheduling to determine which processing element the descriptor will be transmitted to after pre-processing is complete. Opportunistic scheduling takes into account two factors when determining the destination processing element of the descriptor. These two factors are (1) the location of the processing element that the data portion of the packet was transmitted to and (2) available resources at the destination processing element. If the processing element that the data portion was transmitted to does not have available resources to process the data packet, the descriptor will be transmitted to the processing element at the next nearest location that does have available resources. The advantages of the embodiments described herein include a higher utilization of the processing elements while minimizing the bandwidth and latency associated with the transmission of data between processing elements.

Figure 1:
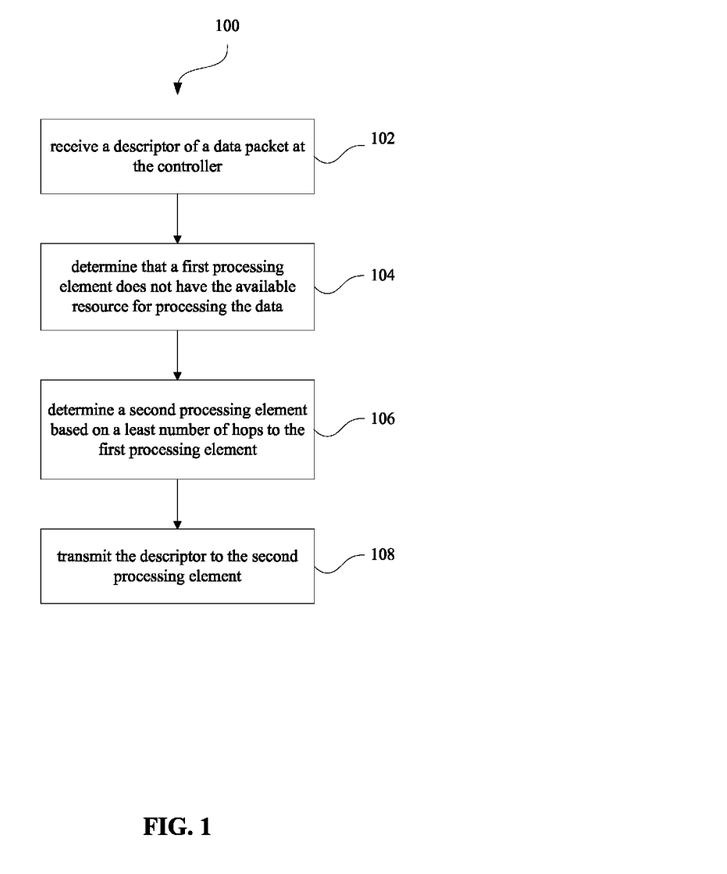
FIG. 1 is a flowchart of one embodiment of a process for opportunistically assigning a processing job of a data packet to a processing element of a computing matrix.

FIG. 1 is a flowchart of one embodiment of a process for opportunistically assigning a processing job of a data packet to a processing element of a computing matrix. The process is typically implemented in a controller that schedules processing jobs for the computing matrix. The controller can be implemented through software or firmware on the same processor as one or more processing elements. Alternatively, the controller can be implemented on a hardware processor separate from any processing element of the computing matrix.

In one embodiment, the process is started in response to receiving a descriptor of a data packet at the controller (Block 102). As noted above, by the time the descriptor is received at the controller, pre-processing has been completed on the descriptor and the data packet is ready to be processed by the computing matrix. Furthermore, the data portion of the packet has been extracted during pre-processing and transmitted to a first processing element of the computing matrix to be stored in a first processing element storage. It should be noted that the "first" designation is only used as an identifier to distinguish one processing element from the other processing elements of the computing matrix. Thus no other meaning should be implied from the designation. The same holds true for references to a "second" processing element hereinafter.

After receiving the descriptor, the controller determines that the first processing element does not have the available resource for processing the data (Block 104). To make the determination, the controller has access to information identifying the first processing element that the data was transmitted to for storage during pre-processing. In one embodiment, a unique identification of the first processing element can be written into the descriptor during pre-processing. Thus, when the controller receives the descriptor, the controller can identify the first processing element. In another embodiment, the unique identification of the first processing element can be written to a memory device coupled with the controller such that the controller can access the memory device to obtain the information.

The controller also has access to information regarding the availability of resources for the first processing element. In one embodiment, the controller can transmit a query to request the status of the first processing element with regards to the availability of resources. This query can be transmitted to the first processing element, or to a different module or processor that maintains an account for the resources of the first processing element. After transmitting the query, the controller receives a response to the query indicating whether the first processing element has the available resource. In another embodiment, the controller itself can maintain an account for the resources of the first processing element, such that no query is necessary.

After obtaining information regarding the availability of resources for the first processing element, the controller determines that the first processing element does not have the available resource to process the data. Alternatively, the determination can be made at the module or processor that maintains the account for the resources of the first processing element, and only the result of the determination is transmitted to the controller.

Furthermore, the determination can be made using several different criteria. In one embodiment, the determination that the first processing element does not have the available resource to process the data is made if the processing queue of the first processing element is full. Alternatively, a threshold setting can be used such that the determination is made if the amount of processing already assigned to the first processing element is above the threshold.

At Block 106, the controller determines a second processing element based on a least number of hops to the first processing element. As noted above, a hop is a connection between two adjacent processing elements. Thus, the least number of hops to the first processing element is the number of connections that must be traversed to reach the first processing element through the shortest path (see FIG. 2 and the related discussion below for more details regarding the least number of hops). Depending on the location of the first processing element and the total number of processing elements in the computing matrix, there can be up to four processing elements that are one hop away from the first processing element. In one embodiment, the controller also checks the availability of resources for each processing element that have an equal least number of hops to the first processing element in order to determine the second processing element. For example, if there are four processing elements that are one hop away from the first processing element, the controller can check the availability of resources for each of the four processing elements. If all four of the processing elements do not have the available resource, this process can be iterated for processing elements at each ascending level of least number of hops to the first processing element until a second processing element is determined.

Furthermore, to determine the least number of hops to the first processing element for any other processing element of the computing matrix, the controller has access to location information regarding each of the processing elements. In one embodiment, the unique identification of the processing elements can be used to determine the location of each processing element in the matrix. In other words, the unique identification of each processing element can be assigned such that the unique identification provides an indication of the location in the matrix (e.g., the unique identification can include the column and row position). Alternatively, a table or some other form of a record can be maintained which include the location information for each processing element, and the controller can look up the information based on the unique identification.

After determining the second processing element, the controller transmits the descriptor to the second processing element (Block 108). In one embodiment, the unique identification of the first processing element is transmitted along with the descriptor to the second processing element. This enables the second processing element to determine where the data portion of the packet that corresponds with the descriptor is stored. Thus, if the second processing element needs access to the data portion of the packet during processing, the second processing element can transmit a request to the first processing element. Depending on the processing performed, the request can be a write request or a read request. In another embodiment, the second processing element can access a memory device that stores the unique identification of the first processing element, and thereby determine where the data portion of the packet is stored.

Figure 2:
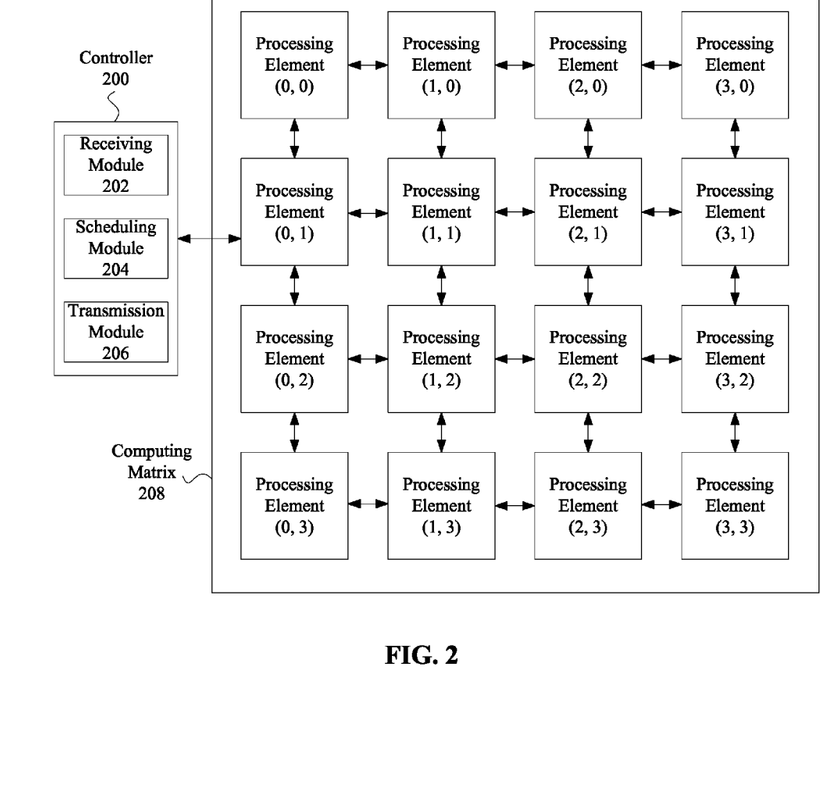
FIG. 2 is a diagram of one embodiment of a computing matrix and a controller that opportunistically assigns a processing job of a data packet to a processing element of the computing matrix.

FIG. 2 is a diagram of one embodiment of a computing matrix 208 and a controller 200 that opportunistically assigns a processing job of a data packet to a processing element of computing matrix 208. Computing matrix 208 includes four columns (0-3) and four rows (0-3), with a processing element at each column and row position. Thus, computing matrix 208 has 16 locations (4 columns*4 rows) and 16 processing elements in this embodiment. In other embodiments, a computing matrix can have any number of columns, rows, and processing elements. Furthermore, the number of columns does not have to equal the number of rows and there does not have to be a processing element at each location of the matrix.

Each processing element is implemented by a network processor; however a network processor can implement multiple processing elements. The network processor can be any type of processing device including a general or central processing unit, an application specific integrated circuit (ASIC) or similar processing device. In other embodiments, a set of network processors are present in the network element. The network processor can be connected with the other components within the network element by a set of buses routed over a set of mainboards or similar substrates. Similarly, multiple processing elements implemented on a single network processor can be connected with each other and with a storage device by a set of buses.

Controller 200 is also implemented by a network processor. In some embodiments, controller 200 can be implemented by the same network processor as one or more processing elements. The network processor executes the modules of controller 200. Controller 200 can be connected with the processing elements and with other components within the network element by a set of buses.

Controller 200 includes receiving module 202, scheduling module 204, and transmission module 206. Receiving module 202 is configured to receive a descriptor of a data packet after pre-processing is complete. When the descriptor is received at receiving module 202, the data portion of the packet has already been extracted and transmitted to a first processing element of the computing matrix for storage. Scheduling module 204 is coupled to receiving module 202 and configured to determine that the first processing element does not have the available resource for processing the data. Scheduling module 204 also determines a second processing element based on a least number of hops to the first processing element. Transmission module 206 is coupled to scheduling module 204 and configured to transmit the descriptor to the second processing element after the second processing element has been determined.

To assist with the understanding of the concept of least number of hops, an example embodiment is described. Assuming that the data portion of a data packet is transmitted to processing element (1, 1) for storage during pre-processing, processing element (1, 1) becomes the first processing element in this embodiment. Processing elements (0, 1 ), (1, 0), (2, 1), and (1, 2) all have a least number of hops to the first processing element equal to one. This is because these four processing elements are all adjacent to the first processing element, thus the first processing element can be reached by traversing only one hop. Although it is also possible to reach the first processing element while traversing more than one hop from any of these four processing elements (e.g., starting from processing element (0, 1), go to (0, 0), then to (1, 0), then to (1, 1), which traverses three hops to reach the first processing element), only the least number of hops is of interest. Processing elements (0, 0), (2, 0), (3, 1), (2, 2), (1, 3), and (0, 2) all have two hops as the least number of hops to the first processing element (1, 1). Processing elements (3, 0), (3, 2), (2, 3), and (0, 3) all have three hops as the least number of hops to the first processing element (1, 1). Processing element (3, 3) has four hops as the least number of hops to the first processing element (1, 1).

Figure 3:
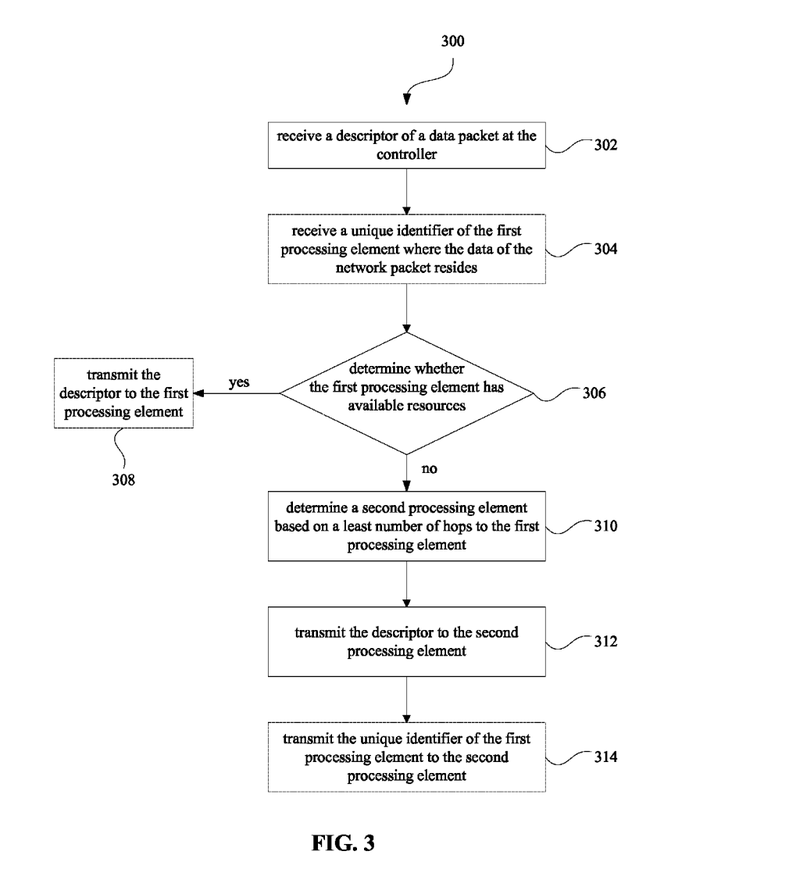
FIG. 3 is a flowchart of one exemplary embodiment of a process for opportunistically assigning a processing job of a data packet to a processing element of a computing matrix.

FIG. 3 is a flowchart of one exemplary embodiment of a process for opportunistically assigning a processing job of a data packet to a processing element of a computing matrix. This process is typically implemented in a controller that schedules processing jobs for the computing matrix.

In one embodiment, the process is started in response to receiving a descriptor of a data packet at the controller (Block 302). By the time the descriptor is received at the controller, the data portion of the packet has been extracted during pre-processing and transmitted to a first processing element of the computing matrix to be stored in a first processing element storage.

The controller also receives a unique identifier of the first processing element where the data portion resides (Block 304). The unique identifier can be received as part of the descriptor or it can be received separately from the descriptor.

Using the unique identifier, the controller makes a determination of whether the first processing element has available resources for processing the data (Block 306). The determination can be based on whether the processing queue of the first processing element is full. Alternatively, a threshold setting can be used in making the determination based on whether the amount of processing already assigned to the first processing element is above the threshold.

If it is determined that the first processing element does have available resources, then the process goes to Block 308. The descriptor is transmitted to the first processing element for processing and the process is complete.

If it is determined that the first processing element does not have available resources for processing the data, the process goes to Block 310. The controller determines a second processing element based on a least number of hops to the first processing element. In one embodiment, the controller also checks the availability of resources for each processing element having an equal least number of hops to the first processing element. This can be done iteratively starting with processing elements that have a least number of hops equal to one. If none of the processing elements one hop away from the first processing element have available resources, the process is repeated in ascending order based on the least number of hops to the first processing element until a second processing element is determined.

After determining the second processing element, the controller transmits the descriptor to the second processing element for additional processing (Block 312). In one embodiment, the unique identification of the first processing element is transmitted along with the descriptor to the second processing element (Block 314). The second processing element can use the unique identification to determine the location of the first processing element. This enables the second processing element to transmit requests to the first processing element, including write requests or read requests, in order to access the data portion of the packet.

Figure 4:
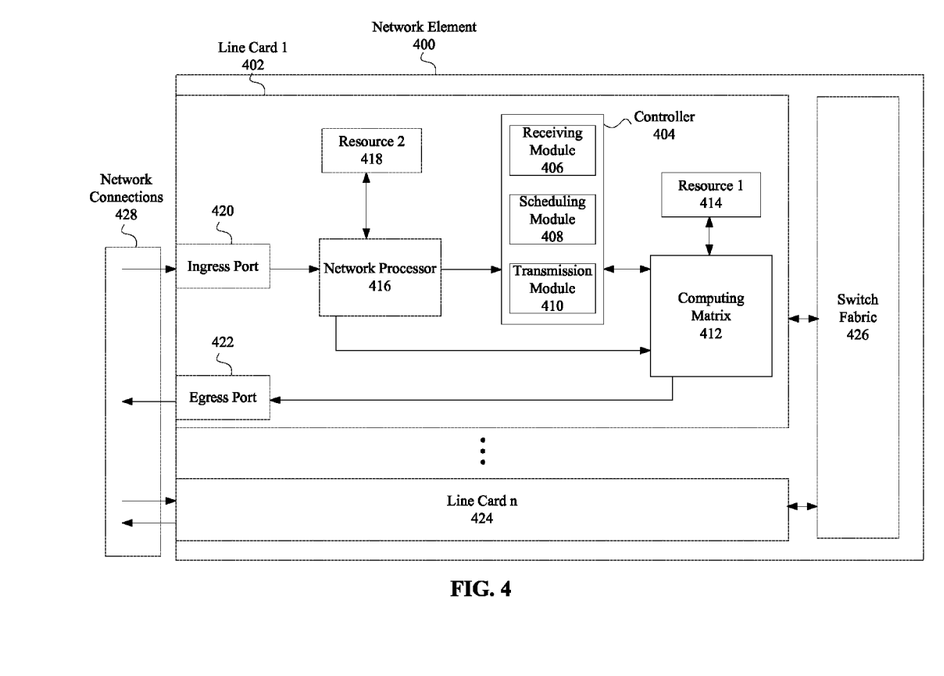
FIG. 4 is a diagram of one embodiment of a system implementing a computing matrix and a controller that opportunistically assigns a processing job of a data packet to a processing element of the computing matrix.

FIG. 4 is a diagram of one embodiment of a system implementing a computing matrix 412 and a controller 404 that opportunistically assigns a processing job of a data packet to a processing element of computing matrix 412. In this embodiment, the system is implemented in a network element 400. More specifically, the system is implemented on a first line card 402 of network element 400. A network element typically includes multiple line cards, depicted in this Figure by the $n^{th}$ line card 424. The line cards can be connected to each other through switch fabric 426, which performs switching to route data packets between line cards.

Although not depicted in this diagram, computing matrix 412 includes multiple processing elements. In this embodiment, computing matrix 412 is implemented by a network processor. In other embodiments, computing matrix 412 can be implemented by multiple network processors. Line card 402 also includes a first resource 414, among other components. The processing element storage for each processing element can be implemented on first resource 414 by partitioning first resource 414 and assigning a partition to each processing element. Alternatively, additional resources can be added for implementing processing element storage for each processing element. First resource 414 can be any memory device capable of storing data for any amount of time, including volatile and non-volatile memory devices.

Controller 404 can be implemented by the same network processor as computing matrix 412. Alternatively, controller 404 can be implemented by a separate network processor. Controller 404 includes receiving module 406, scheduling module 408, and transmission module 410. Each module is executed by the network processor implementing controller 404. Receiving module 406 is configured to receive a descriptor of a data packet after pre-processing is complete. Scheduling module 408 is coupled to receiving module 406 and configured to determine that a first processing element that has the data stored does not have the available resource for processing the data. Scheduling module 408 also determines a second processing element based on a least number of hops to the first processing element. Transmission module 410 is coupled to scheduling module 408 and configured to transmit the descriptor to the second processing element after the second processing element has been determined.

Line card 402 can also include network processor 416 for performing the pre-processing on data packets. In other embodiments, network processor 416 can also implement controller 404 and/or computing matrix 412. A second resource 418 can also be implemented on line card 402 as a memory device for network processor 416. In another embodiment, first resource 414 and second resource 418 can be the same memory device, each resource being a partition of the memory device. Like first resource 414, second resource 418 can be any memory device capable of storing data for any amount of time, including volatile and non-volatile memory devices.

Line card 402 can also include an ingress port 420 for receiving incoming data packets and egress port 422 for transmitting outgoing data packets. Ingress port 420 can be any type or combination of networking ports including wireless or wired connection/communication ports and associated hardware and software for processing incoming layer 1 and/or layer 2 data and control traffic. Ingress port 420 thereby connects network element 400 with any number of network devices and/or computing devices through one of network connections 428. Similarly, egress port 422 can be any type or combination of networking ports including wireless or wired connection/communication ports and associated hardware and software for processing outgoing layer 1 and/or layer 2 data and control traffic. Egress port 422 thereby connects network element 400 with any number of network devices and/or computing devices through one of network connections 428. In some embodiments, ingress port 420 and egress port 422 can be implemented as a single port capable of performing both receiving and transmitting, typically known in the field as a transceiver module port.

After receiving an incoming data packet, ingress port 420 transmits the data packet to network processor 416 for pre-processing. During pre-processing, the data portion of the packet is transmitted to a first processing element of computing matrix 412 for storage. When pre-processing is complete, the descriptor of the data packet is transmitted to controller 404. Controller 404 assigns the descriptor to a processing element of computing matrix 412 according to any one of the embodiments described herein. After processing is complete at computing matrix 412, the data packet is transmitted to a destination line card (e.g., $n^{th}$ line card 424) through switch fabric 426 for outgoing transmission. In some cases, the destination line card can be the same as the receiving line card. Additional processing can be performed at the destination line card before the data packet is transmitted back out into the network through an egress port on one of network connections 428. In this manner, network element 400 performs processing on each data packet received and thereby routes the data packet to the proper communication channel for delivery to its intended destination end station.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a controller of a plurality of processing elements to reduce processing time of a data packet in a network element by opportunistically assigning a processing job to a different processing element than where a data for the processing job resides, where the plurality of processing elements are arranged in a matrix with a column position and a row position, where each of the plurality of processing elements has a point to point connection with each adjacent processing element, where each processing element includes a separate processing element storage, where the data packet includes the data and a descriptor, where the data is transmitted to a first processing element of the plurality of processing elements to be stored in a first processing element storage before the descriptor is received by the controller, and where the data is processed after the descriptor is received, the method comprising the steps of:
   receiving the descriptor at the controller;
   determining that the first processing element does not have an available resource for processing the data;
   determining a second processing element of the plurality of processing elements based on a least number of hops to the first processing element, wherein a hop is a connection between two adjacent processing elements; and
   transmitting the descriptor to the second processing element.

2. The method of claim 1, further comprising the step of:
   determining the second processing element within a second plurality of processing elements based on an amount of processing assigned to each of the second plurality of processing elements, wherein each of the second plurality of processing elements has an equal least number of hops to the first processing element.

3. The method of claim 1, wherein determining that the first processing element does not have the available resource for processing the data further comprises the steps of:
   transmitting a query to request a status of the first processing element; and
   receiving a response to the query indicating whether the first processing element has the available resource for processing the data.

4. The method of claim 1, further comprising the steps of:
   receiving a unique identifier of the first processing element along with the descriptor at the controller; and
   determining a location of the first processing element based on the unique identifier.

5. The method of claim 4, further comprising the step of:
   transmitting the unique identifier of the first processing element along with the descriptor to the second processing element.

6. The method of claim 1, wherein determining that the first processing element does not have the available resource for processing the data further comprises the step of:
   determining that the first processing element is at a threshold level for an amount of processing assigned to the first processing element.

7. A controller for managing a plurality of processing elements to reduce processing time of a data packet in a network element by opportunistically assigning a processing job to a different processing element than where a data for the processing job resides, wherein the plurality of processing elements are arranged in a matrix with a column position and a row position, wherein each of the plurality of processing elements has a point to point connection with each adjacent processing element, wherein each processing element includes a separate processing element storage, wherein the data packet includes the data and a descriptor, wherein the data is transmitted to a first processing element of the plurality of processing elements to be stored in a first processing element storage before the descriptor is received by the controller, and wherein the data is processed after the descriptor is received, the controller comprising:
   a processor; and
   a memory storing a plurality of modules comprising instructions for execution on the processor, the plurality of modules including:
   a receiving module configured to receive the descriptor;
   a scheduling module coupled to the receiving module and configured to determine that the first processing element does not have an available resource for processing the data, and further configured to determine a second processing element of the plurality of processing elements based on a least number of hops to the first processing element, wherein a hop is a connection between two adjacent processing elements; and
   a transmission module coupled to the scheduling module and configured to transmit the descriptor to the second processing element.

8. The controller of claim 7, wherein the scheduling module is further configured to determine the second processing element within a second plurality of processing elements based on an amount of processing assigned to each of the second plurality of processing elements, wherein each of the second plurality of processing elements has an equal least number of hops to the first processing element.

9. The controller of claim 7, wherein the scheduling module is further configured to transmit a query to request a status of the first processing element and receive a response to the query indicating whether the first processing element has the available resource for processing the data.

10. The controller of claim 7, wherein the receiving module is further configured to receive a unique identifier of the first processing element along with the descriptor at the controller, and wherein the scheduling module is further configured to determine a location of the first processing element based on the unique identifier.

11. The controller of claim 10, wherein the transmission module is further configured to transmit the unique identifier of the first processing element along with the descriptor to the second processing element.

12. The controller of claim 7, wherein the scheduling module determines that the first processing element does not have the available resource for processing the data by determining that the first processing element is at a threshold level for an amount of processing assigned to the first processing element.

13. A system for employing a computing matrix to reduce processing time of a data packet in a network element by opportunistically assigning a processing job, wherein the data packet includes a data and a descriptor, wherein the data is received by the computing matrix and stored before the descriptor is received by the computing matrix, and wherein the data is processed after the descriptor is received by the computing matrix, the system comprising:
- a plurality of processing elements configured in a matrix arrangement, wherein each of the plurality of processing elements has a point to point connection with each adjacent processing element, and wherein each of the plurality of processing element includes a separate processing element storage; and
- a controller coupled to the plurality of processing elements and configured to receive the descriptor of the data packet, determine that a first processing element of the plurality of processing elements does not have an available resource for processing the data, determine a second processing element of the plurality of processing elements based on a least number of hops to the first processing element, and transmit the descriptor to the second processing, wherein the data resides within a first processing element storage of the first processing element when the descriptor is received, and wherein a hop is a connection between two adjacent processing elements.

14. The system of claim 13, wherein the controller is further configured to determine the second processing element within a second plurality of processing elements based on an amount of processing assigned to each of the second plurality of processing elements, wherein each of the second plurality of processing elements has an equal least number of hops to the first processing element.

15. The system of claim 13, wherein the controller is further configured to transmit a query to request a status of the first processing element and receive a response to the query indicating whether the first processing element has the available resource for processing the data.

16. The system of claim 13, wherein the controller is further configured to receive a unique identifier of the first processing element along with the descriptor, determine a location of the first processing element based on the unique identifier, and transmit the unique identifier along with the descriptor to the second processing element.

17. The system of claim 13, wherein the controller determines that the first processing element does not have the available resource for processing the data by determining that the first processing element is at a threshold level for an amount of processing assigned to the first processing element.

18. The system of claim 13, wherein the second processing element is configured to process the data in response to receiving the descriptor.

19. The system of claim 13, wherein the second processing element is configured to generate an access request for the data and transmit the access request to the first processing element, the access request including at least one of a read request and a write request.

20. The system of claim 13, further comprising an egress port coupled to one of the plurality of processing elements and configured to receive the data packet after processing and transmit the data packet into a telecommunications network.

* * * * *